(12) United States Patent
Takeuchi et al.

(10) Patent No.: US 8,150,445 B2
(45) Date of Patent: Apr. 3, 2012

(54) BASE STATION AND WIRELESS COMMUNICATION SYSTEM

(75) Inventors: Keisuke Takeuchi, Yokohama (JP);
Kenzaburo Fujishima, Kokubunji (JP);
Rintaro Katayama, Tachikawa (JP);
Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 12/480,908

(22) Filed: Jun. 9, 2009

(65) Prior Publication Data
US 2009/0305741 A1    Dec. 10, 2009

(30) Foreign Application Priority Data

Jun. 10, 2008  (JP) ................... 2008-151465

(51) Int. Cl.
*H04B 7/00* (2006.01)
(52) U.S. Cl. ........................................ 455/522
(58) Field of Classification Search .............. 455/500, 455/522, 524
See application file for complete search history.

(56) References Cited

U.S. PATENT DOCUMENTS

| | | | |
|---|---|---|---|
| 6,501,954 B2 * | 12/2002 | Kito | 455/453 |
| 2010/0062799 A1 * | 3/2010 | Ishii et al. | 455/522 |

FOREIGN PATENT DOCUMENTS

JP   2007-129405   5/2007

OTHER PUBLICATIONS

3GPP2 C.S0084-002-0 Version 2.0, Aug. 2007, Medium Access Control Layer for Ultra Mobile Broadband (UMB) Air Interface Specification.
3GPP2 C.S0084-006-0 Version 2.0, Aug. 2007, Connection Control Plane for Ultra Mobile Broadband (UMB) Air Interface Specification.

* cited by examiner

*Primary Examiner* — Nguyen Vo
(74) *Attorney, Agent, or Firm* — Antonelli, Terry, Stout & Kraus, LLP.

(57) ABSTRACT

Provided is a wireless base station comprising: a power control unit, a reference information acquisition unit and a reference information storing unit, wherein the wireless base station comprises a first control signal receiving unit for receiving a first uplink control signal used by a mobile station connected to the wireless base station and for requesting the power control unit to control the transmission, and a second control signal receiving unit for receiving a second uplink control signal used by a mobile station connected to the neighbor base station and for requesting the power control unit to control the transmission power, and wherein the power control unit controls the transmission power of the downlink signal based on the request to control the transmission power from the first control signal receiving unit and the request to control the transmission power from the second control signal receiving unit.

9 Claims, 8 Drawing Sheets

BASE STATION AND WIRELESS COMMUNICATION SYSTEM

CLAIM OF PRIORITY

The present application claims priority from Japanese patent application JP 2008-151465 filed on Jun. 10, 2008, the content of which is hereby incorporated by reference into this application.

BACKGROUND

This invention relates to a wireless communication system, and is particularly preferable for a cellular wireless communication system including small-scale base stations (such as femto cell base stations).

Conventionally, a cellular wireless communication system such as a system for cellular phones has employed macro cells in which one base station covers a wide area. The macro cell system has such characteristics that it reduces the number of handoffs and thus is suitable for a high-speed travel, and that the area can be extended by a small number of base stations. The macro cell system has a defect that it is difficult to overcome locally-generated blind spots such as those generated indoors.

In order to address this problem, an approach that, at a location which it is hard for radio waves from a macro cell base station to reach, a base station for providing a cell smaller than the macro cell is provided to eliminate a blind spot, has been proposed.

In particular, recently, a femto cell system in which a base station as small as to cover only a single house is provided in each household has been gaining attention, and there has been a trend of employing the femto cell system in the WiMAX and the evolution data optimized (EV-DO).

In the femto cell system, a small base station (femto cell base station) having a wireless coverage as wide as a wireless LAN is provided in each household, and the femto cell base station is connected to a cellular communication network via the Internet. Since the femto cell base station is intended for eliminating blind spots, the femto cell base stations are operated in a manner that the femto cells locally overlap the macro cells. Moreover, a frequency band used by the femto cell base station is the same as a frequency band used by the macro cell base station.

At a location where cells provided by two base stations using the same frequency overlap each other, for a mobile station connected to one of the base stations, a downlink signal from the other base station, to which the mobile station is not connected, appears as interference to a downlink signal from the base station, which is the destination of the connection. When this interference occurs in a burst manner, the reception quality of the downlink signal to the mobile station degrades. This problem is pointed out in JP 2007-129405 A.

SUMMARY

In the macro cell system, in order to address this problem, base stations are arranged so as to overlap as little as possible, or a transmission schedule for downlink signals is set so as to randomly generate interferences. In other words, by reducing a probability of generation of the burst interferences, the degradation of the reception quality of the downlink signal is mitigated.

On the other hand, in the femto cell system, it is assumed that a macro cell and a femto cell overlap each other. Moreover, compared with the macro cell system, the number of base stations is much larger, resulting in difficulty in optimization of the transmission schedule for the downlink signal.

For those reasons, in the femto cell system, it is difficult to apply the method of reducing the probability of generation of burst interferences as in the macro cell system. Thus, it is desirable to reduce the degradation of the reception quality by controlling the power of an interfering signal so that, even when an interference occurs, the influence thereof is reduced.

In order to control the power of an interfering downlink signal, a mechanism in which an interfered mobile station notifies an interfering base station of a state of interference, so that, based on this information, the base station controls the transmission power of the downlink signal is necessary. Specifically, for the mobile station, a function of measuring an interference power and a function of identifying the interfering base station are necessary. Moreover, for a wireless interface, a wireless channel for notifying the mobile station of information necessary for identifying the interfering base station, and a wireless channel used by the mobile station to notify the interfering base station of the interference state are necessary.

However, some existing cellular wireless communication standards such as the EV-DO and the ultra mobile broadband (UMB) for which installation of the femto cell system is being studied do not have a wireless channel required for the downlink transmission power control in the wireless interface. In this case, the downlink power control for restraining the reception quality of the downlink signal from being degraded by an interference cannot be carried out.

It should be noted that the EV-DO is technical specifications for data communication among the third-generation mobile communication systems: CDMA2000, and the UMB is a next-generation communication system for mobiles announced by the standardization project 3GPP2, which formulates specifications for the third-generation mobile phones.

A representative aspect of this invention is as follows. That is, there is provided a wireless base station comprising: a power control unit for controlling a transmission power of a downlink signal; a reference information acquisition unit for acquiring, from a neighbor base station, reference information necessary for receiving an uplink control signal transmitted from a mobile station connected to the neighbor base station; and a reference information storing unit for storing the reference information acquired by the reference information acquiring unit. The wireless base station comprises: a first control signal receiving unit for receiving a first uplink control signal used by a mobile station connected to the wireless base station to notify the wireless base station of a reception state of the downlink signal, and for requesting the power control unit to control the transmission power based on the received first uplink control signal; and a second control signal receiving unit for receiving a second uplink control signal used by a mobile station connected to the neighbor base station to notify the neighbor base station of a reception state of the downlink signal by referring to the reference information stored in the reference information storing unit, and for requesting the power control unit to control the transmission power based on a content of the received second uplink control signal. The power control unit is configured to control the transmission power of the downlink signal based on the request to control the transmission power from the first control signal receiving unit and the request to control the transmission power from the second control signal receiving unit.

According to one embodiment of this invention, without changing the configuration of the mobile station and the wireless interface of the system, the interference from the neighbor base station can be controlled. As a result, even when a femto cell system is additionally installed in an existing cellular wireless communication system, a degradation in reception quality of a downlink signal caused by interference from a femto cell base station can be reduced.

BRIEF DESCRIPTION OF THE DRAWINGS

The present invention can be appreciated by the description which follows in conjunction with the following figures, wherein.

DESCRIPTION OF THE PREFERRED EMBODIMENTS

First Embodiment

A description is made of a first embodiment of this invention with reference to FIGS. 1 to 6.

Figure 1:
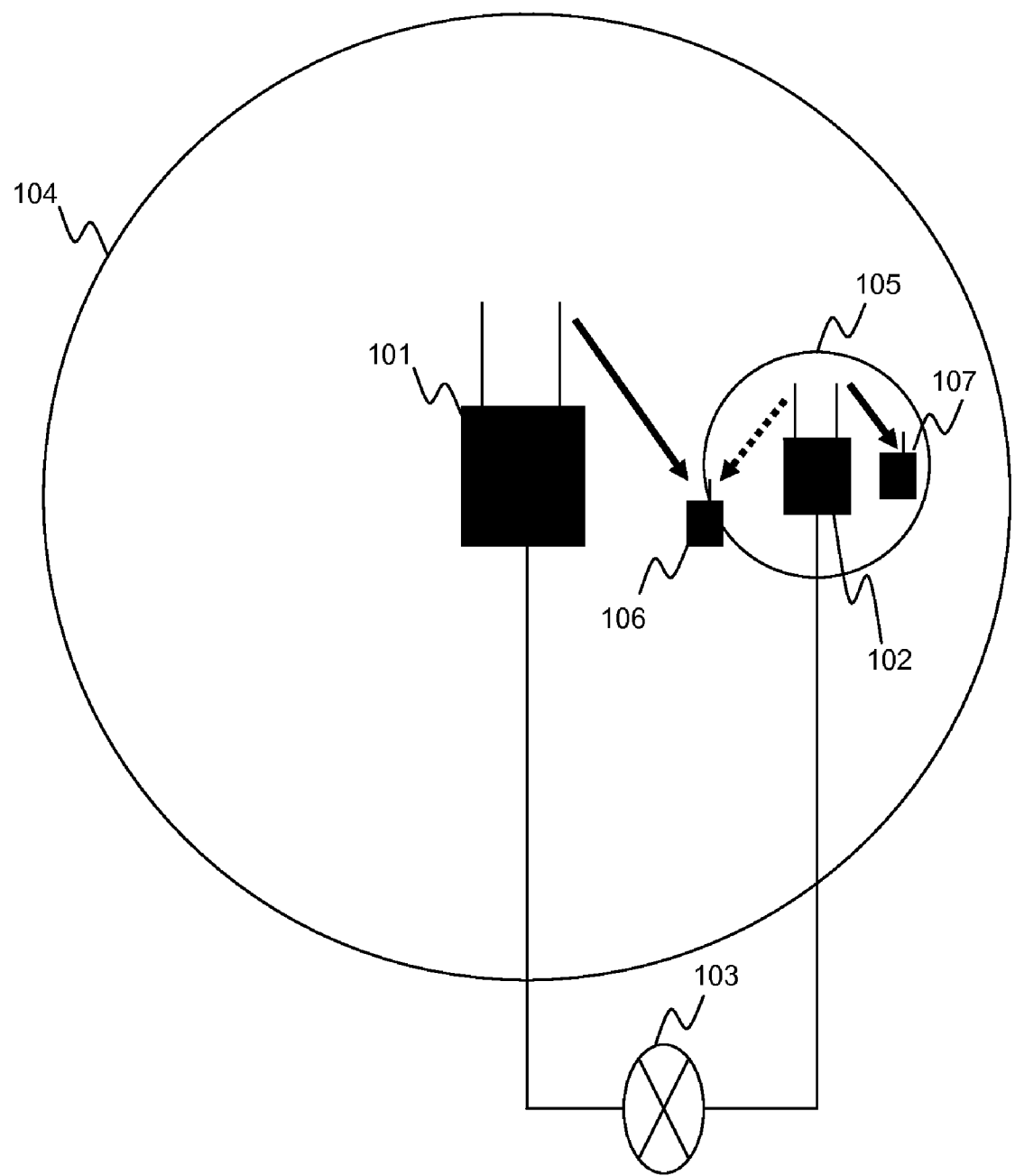
FIG. 1 is a diagram of a configuration of a cellular wireless communication system in accordance with a first embodiment of this invention.

FIG. 1 is a diagram of a configuration of a cellular wireless communication system according to the first embodiment of this invention.

The cellular wireless communication system according to the first embodiment includes a plurality of base stations, and, to each of the base stations (BSs), one or more mobile stations are connected. Base stations 101 and 102 are provided with a common wireless interface, and use the same frequency band. Moreover, the base stations 101 and 102 are connected via wired lines (or wireless links) to a network 103. The base station 101 is a macro cell base station, which has a service area (macro cell) with a radius of several hundred meters to ten and several kilometers. The base station 102 is a femto cell base station, which has a small radio wave output and a service area (femto cell) with a radius of several tens of meters. In other words, the femto cell base station forms, inside a macro cell 104 formed by the base station 101, a femto cell 105, which covers a smaller area than the macro cell 104.

Mobile stations 106 and 107 are connected to the base station 101 or 102 via a wireless link, thereby communicating with the network 103.

Figure 2:
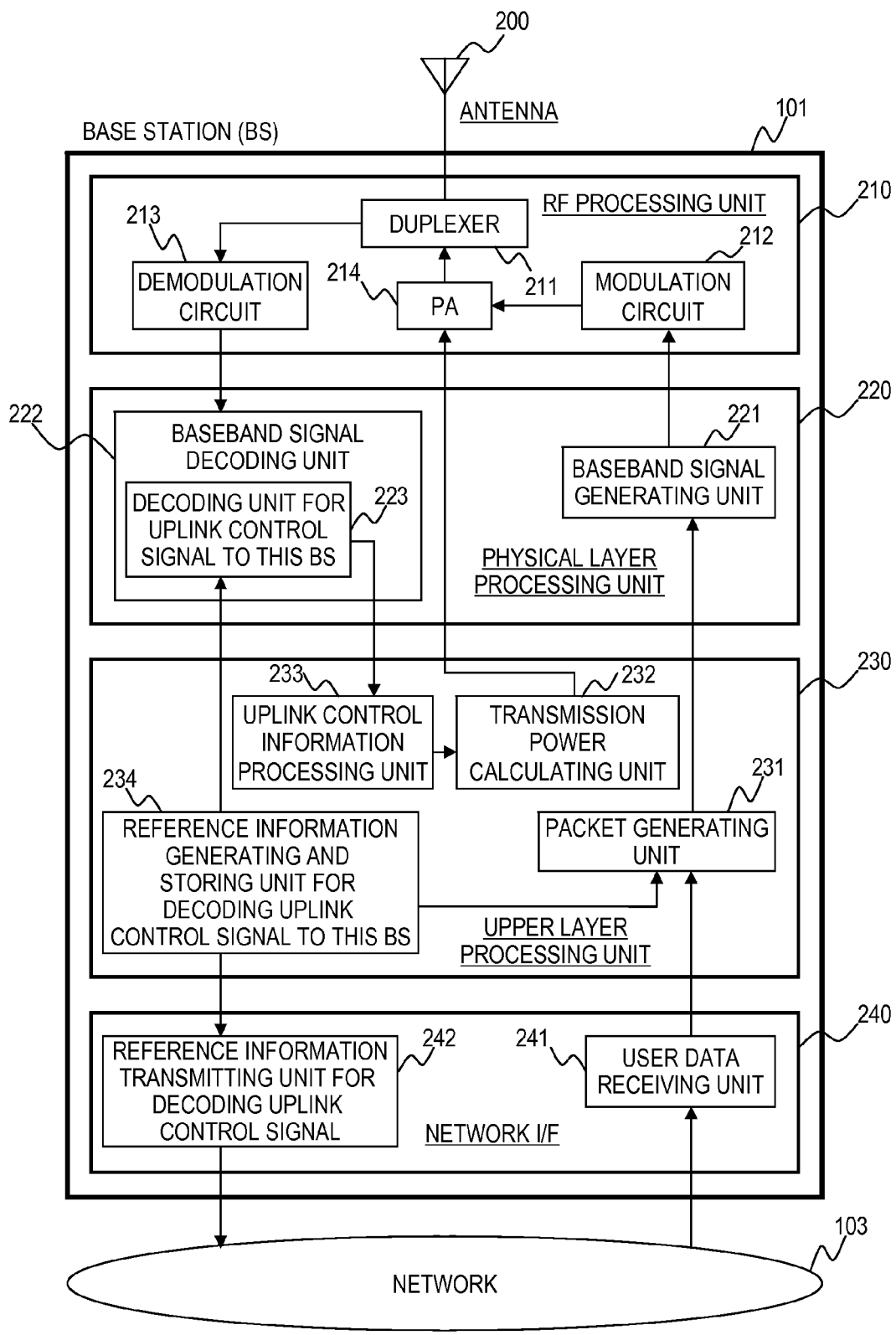
FIG. 2 is a block diagram illustrating a configuration of the base station in accordance with a first embodiment of this invention.

FIG. 2 is a block diagram illustrating a configuration of the base station 101.

The macro cell base station 101 according to the first embodiment includes an antenna 200, an RF processing unit 210, a physical layer processing unit 220, an upper layer processing unit 230, and a network interface (I/F) 240.

The RF processing unit 210 is a processing unit for processing a signal at a wireless level and includes a duplexer 211, a modulation circuit 212, a demodulation circuit 213 and a power amplifier (PA) 214.

The physical layer processing unit 220 is a processing unit for processing a baseband signal on a physical layer, and includes a baseband signal generating unit 221 and a baseband signal decoding unit 222. The baseband signal decoding unit 222 includes a decoding unit for uplink control signal to this BS 223 for decoding a signal transmitted to the base station 101.

The upper layer processing unit 230 is a processing unit for processing a signal on Layer 2 (data link layer) or higher layer, and includes a packet generating unit 231, a transmission power calculating unit 232 for determining a power of a downlink signal transmitted by the base station 101, an uplink control information processing unit 233 for extracting predetermined information from a header section of the uplink control signal, and a reference information generating and storing unit for decoding uplink control signal to this BS 234 for storing information used for decoding a signal transmitted to the base station 101 (such as a PilotID, a Softer Handoff Group ID (SHOGID), and a MACID).

It should be noted that the PilotID is information for identifying a sector. The SHOGID is information for identifying a sector group generated for handoff between sectors within the same base station. The MACID is information used by a base station for uniquely identifying a mobile station connected to the base station.

The network interface 240 includes a user data receiving unit 241 for receiving data from the network 103 and a reference information transmitting unit for decoding uplink control signal 242 for transmitting information used for decoding a control signal to the network 103.

Figure 3:
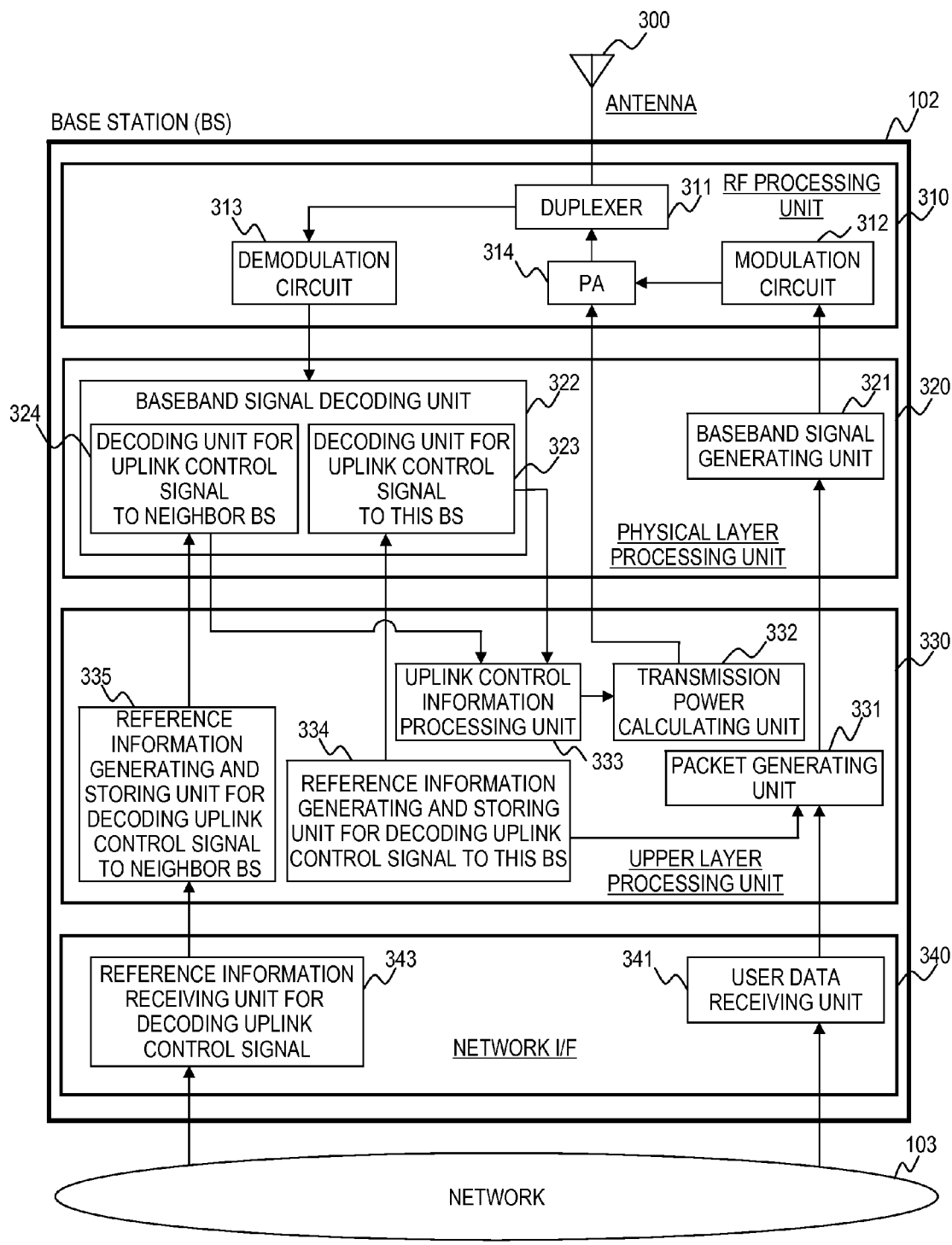
FIG. 3 is a block diagram illustrating a configuration of the base station in accordance with a first embodiment of this invention.

FIG. 3 is a block diagram illustrating a configuration of the base station 102.

The base station 102 includes an antenna 300, an RF processing unit 310, a physical layer processing unit 320, an upper layer processing unit 330, and a network interface (I/F) 340.

The RF processing unit 310 includes a duplexer 311, a modulation circuit 312, a demodulation circuit 313 and a power amplifier (PA) 314. The RF processing unit 310 and the respective components have the same functions as those of the RF processing unit 210 and the respective components illustrated in FIG. 2.

The physical layer processing unit 320 includes a baseband signal generating unit 321 and a baseband signal decoding unit 322. The baseband signal generating unit 321 has the same functions as those of the baseband signal generating unit 221 illustrated in FIG. 2.

The baseband signal decoding unit 322 includes a decoding unit for uplink control signal to this BS 323 and a decoding unit for uplink control signal to neighbor BS 324.

The decoding unit for uplink control signal to this BS 323 has the same functions as those of the decoding unit for uplink control signal to this BS 223 illustrated in FIG. 2. The decoding unit for uplink control signal to neighbor BS 324 is a processing unit for decoding a signal to be transmitted to a neighbor base station.

The upper layer processing unit 330 includes a packet generating unit 331, a transmission power calculating unit 332, an uplink control information processing unit 333, a reference information generating and storing unit for decoding uplink control signal to this BS 334, and a reference information generating and storing unit for decoding uplink control signal to neighbor BS 335. The packet generating unit 331, the transmission power calculating unit 332, the uplink control information processing unit 333, and the reference information generating and storing unit for decoding uplink control signal to this BS 334 respectively have the same functions as those of the packet generating unit 231, the transmission power calculating unit 232, the uplink control information processing unit 233, and the reference information generating and storing unit for decoding uplink control signal to this BS 234 illustrated in FIG. 2. The reference information generating and storing unit for decoding uplink control signal to neighbor BS 335 has a function for storing information (such as a PilotID, an SHOGID, and a MACID) used for decoding a signal to be transmitted to a neighbor base station.

The network interface 340 includes a user data receiving unit 341 and a reference information receiving unit for decoding uplink control signal 343. The user data receiving unit 341 has the same functions as those of the user data receiving unit 241 illustrated in FIG. 2. The reference information receiving unit for decoding uplink control signal 343 is a processing unit for receiving information used for decoding an uplink control signal to be transmitted to a neighbor base station from the network 103.

Hereinafter, a description is made of an operation of the first embodiment of this invention. The wireless interface is compliant with the UMB specification.

Figure 4:
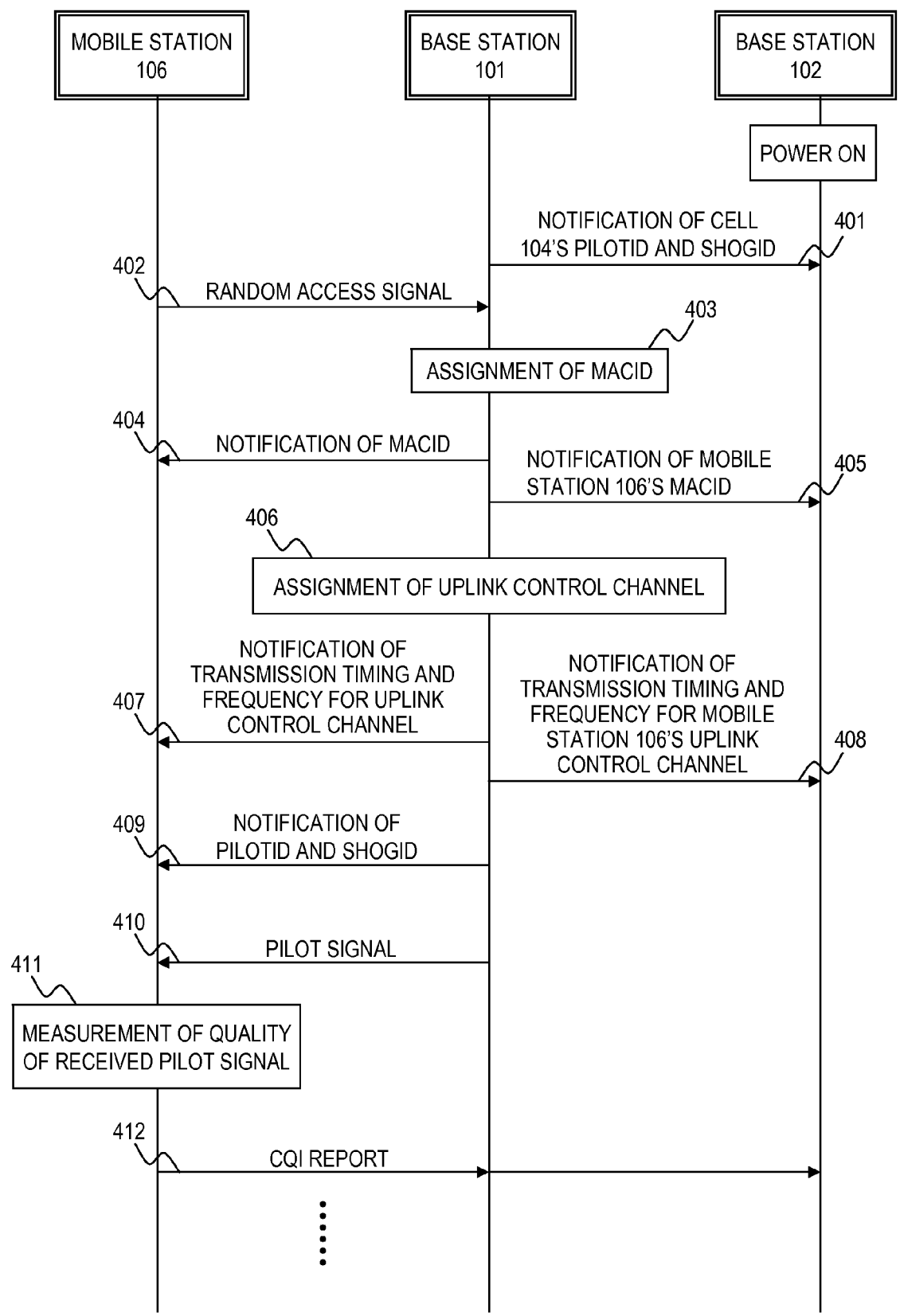
FIG. 4 is a sequence diagram illustrating communication steps taken between the respective devices in accordance with a first embodiment of this invention.

FIG. 4 is a sequence diagram illustrating communication steps taken between the respective devices.

It should be noted that FIG. 4 illustrates processing of adding the base station 102 while the base station 101 is operating. The mobile station 106 is connected to the base station 101.

A description is made of steps of the base station 102 acquiring a PilotID and the like of the cell 104 formed by the base station 101.

When the base station 102 starts up and connects to the network 103, the base station 102 refers to a list of neighbor base stations stored in the base station 102. Then, the base station 102 acquires, via the network 103, the PilotID and the SHOGID of the cell 104 formed by the base station 101 from the neighbor base station (base station 101 on this occasion) (step 401). The base station 101 stores the PilotID and the SHOGID of the cell 104 in the reference information generating and storing unit for decoding uplink control signal to this BS 234. The base station 102 stores the acquired PilotID and SHOGID of the cell 104 in the reference information generating and storing unit for decoding uplink control signal to neighbor BS 335.

Moreover, the base station 102 also acquires, from neighbor base stations other than the base station 101, a Pilot ID and an SHOGID of cells formed by the neighbor base stations (step 401), and stores the acquired Pilot ID and SHOGID in the reference information generating and storing unit for decoding uplink control signal to neighbor BS 335.

A description is made of steps when the mobile station 106 is to be connected to the base station 101.

The mobile station 106 transmits a random access signal to the base station 101 to which the mobile station 106 wants to connect (step 402). The reference information generating and storing unit for decoding uplink control signal to this BS 234 of the base station 101 which has received the random access signal issues a MACID (step 403). The issued MACID is notified to the mobile station 106 by an Access Grant message (step 404).

It should be noted that the Access Grant message is defined in Chapter 5.5.4.1.1.3.1 of 3GPP2 C.S0084-002-0 Ver. 2.0.

Then, the reference information transmitting unit for decoding uplink control signal 242 of the base station 101 also notifies the base station 102 of the MACID assigned to the mobile station 106 via the network 103 (step 405). The reference information receiving unit for decoding uplink control signal 343 of the base station 102 receives the notified MACID, and stores the received MACID in the reference information generating and storing unit for decoding uplink control signal to neighbor BS 335.

Then, the base station 101 assigns an uplink control channel used for the mobile station 106 to transmit channel quality indicator (CQI) information (step 406). A CQI is an indicator of reception quality measured by a mobile station.

The reference information generating and storing unit for decoding uplink control signal to this BS 234 of the base station 101, after the completion of the assignment, generates information for uniquely identifying a transmission timing and a frequency of the uplink control channel, and notifies the mobile station 106 of the generated information via a wireless communication link (step 407).

A message used in the step 407 is defined in Chapter 7.5.7 of 3GPP2 C.S0084-006-0 Ver. 2.0.

Moreover, the reference information transmitting unit for decoding uplink control signal 242 of the base station 101 notifies the base station 102 of the information on the transmission timing and the frequency of the uplink control channel assigned to the mobile station 106 via the network 103 (step 408). The reference information receiving unit for decoding uplink control signal 343 of the base station 102 receives the notified information, and the reference information generating and storing unit for decoding uplink control signal to neighbor BS 335 stores the received information.

Further, the base station 101 notifies the mobile station 106 of the Pilot ID and the SHOGID of the cell 104 (step 409).

A message used in the step 409 is defined in Chapter 7.5.4 of 3GPP2 C.S0084-006-0 Ver. 2.0.

Subsequently, each time a new mobile station is connected to the base station 101, the sequence of steps 402, 403, 404, 406, 407, and 409 is carried out between the base station 101 and the mobile station. Moreover, between the base stations 101 and a newly started femto cell base station other than the base station102, the sequence of the steps 401, 405 and 408 is carried out.

Steps of connecting when a mobile station (such as the mobile station 107 illustrated in FIG. 1) is connected to the base station 102 are the same as the steps when the mobile station 106 is connected to the base station 101. Thus, in the sequence in FIG. 4, the base station 101 can be replaced by the base station 102, and the mobile station 106 can be replaced by the mobile station 107. In other words, the base station 102 assigns a MACID to the mobile station 107 (steps 402, 403, and 404), and then, assigns a transmission timing and a frequency of an uplink control channel (steps 406 and 407). Then, a PilotID and an SHOGID of the cell 105 formed by the base station 102 are notified (step 409).

A description is made of steps in which a mobile station notifies a base station of CQI information.

When the connection between the mobile station 106 and the base station 101 has been established and the uplink control channel has been assigned to the mobile station 106, the mobile station 106 receives a downlink pilot signal periodically transmitted from the base station 101 of the connection (step 410). The mobile station 106, based on the received pilot signal, measures a reception quality (step 411), and periodically transmits a result of the measurement of the reception quality as the CQI information to the base station 101 of the connection destination (step 412). The CQI information is contained in an uplink control signal, and is transmitted using the transmission timing and the frequency which are notified in advance in the step 407.

A description is made of a case in which the base station 102, which is a femto cell base station, receives an uplink control signal transmitted from the mobile station 106 connected to the neighbor base station 101.

The mobile station 106 transmits to the base station 101 an uplink control signal which contains the CQI information acquired by measuring the downlink pilot signal transmitted by the base station 101. Moreover, the mobile station 107 transmits to the base station 102 an uplink control signal which contains the CQI information acquired by measuring the downlink pilot signal transmitted by the base station 102.

On this occasion, if the mobile station 106 is close to the cell 105, an uplink control signal to be transmitted from the mobile station 106 to the base station 101 possibly reaches the base station 102.

Then, the base station 102 has been notified of the transmission timing and the frequency of the uplink control channel of the mobile station 106 in the step 408, and hence the base station 102 receives an uplink control signal transmitted thereto, and can also receive the uplink control signal transmitted from the mobile station 106, which is connected to the neighbor base station 101, to the neighbor base station 101.

A description is made of information required for a mobile station to decode the uplink control signal.

The mobile station, to the CQI information, sequentially applies error correction encoding, channel interleave, repetition, scrambling, and modulation. The modulated CQI information, after mapped to a predetermined physical resource, is transformed by the Inverse Fast Fourier Transform (IFFT), and is transmitted from the mobile station as an orthogonal frequency division multiplexing (OFDM) signal.

It should be noted that the OFDM is a type of frequency division multiplexing (FDM) for transmitting symbols in parallel by means of multiple carriers different from each other in center frequency. In order that the use efficiency of the frequency is increased, the carriers are arranged so as to be orthogonal to each other so that interference does not occur even when the bands of the carriers are close to each other.

The base station applies, to the received CQI information, processing inverse to the processing applied by the mobile station so as to obtain the CQI information. Of the processing applied to the received CQI information, in the scrambling, an MACID, an SHOGID, a PilotID, a frame number, and a Superframe number are used as parameters for calculation.

On the mobile station, as the SHOGID and the PilotID, the values notified by the base station of the connection destination in the step 409 are used. The frame number is a number of a frame in the Superframe, and all sectors take the same value. The Superframe number is a serial number of a Superframe counted from the start of the system time, and all sectors take the same value.

Thus, in order for the base station to decode the uplink control signal transmitted from the mobile station, it is necessary that the MACID, the SHOGID, and the PilotID assigned to the mobile station are known.

When the source of the transmission of an uplink control signal received by a base station is a mobile station connected to the base station, in other words, when the base station 101 receives the uplink control signal from the mobile station 106, the MACID, the SHOGID, and the PilotID are information of which this base station 101 itself has notified the mobile station 106 in the steps 404 and 407, and hence they are naturally stored in this base station 101.

On the other hand, the source of the transmission of the uplink control signal received by the base station is a mobile station connected to a neighbor base station, in other words, the base station 102 receives the uplink control signal from the mobile station 106, the base station 102 decodes the uplink control signal using the MACID, the SHOGID, and the PilotID of which the neighbor base station 101 has notified the mobile station 106.

On this occasion, the base station 102 does not need to newly acquire the MACID, the SHOGID, and the PilotID.

This is because, as the operation of the base station 102 illustrated in FIG. 4, by the time the processing is completed up to the step 408, the base station 102 has acquired the MACID, the SHOGID, and the PilotID from the base station 101 in the steps 401 and 405 and has stored them in the reference information generating and storing unit for decoding uplink control signal to neighbor BS 335.

Thus, a base station can refer to even CQI information transmitted from a mobile station connected to a neighbor base station.

A description is made of steps carried out by the base station 102 for decoding a received uplink control signal.

Figure 5:
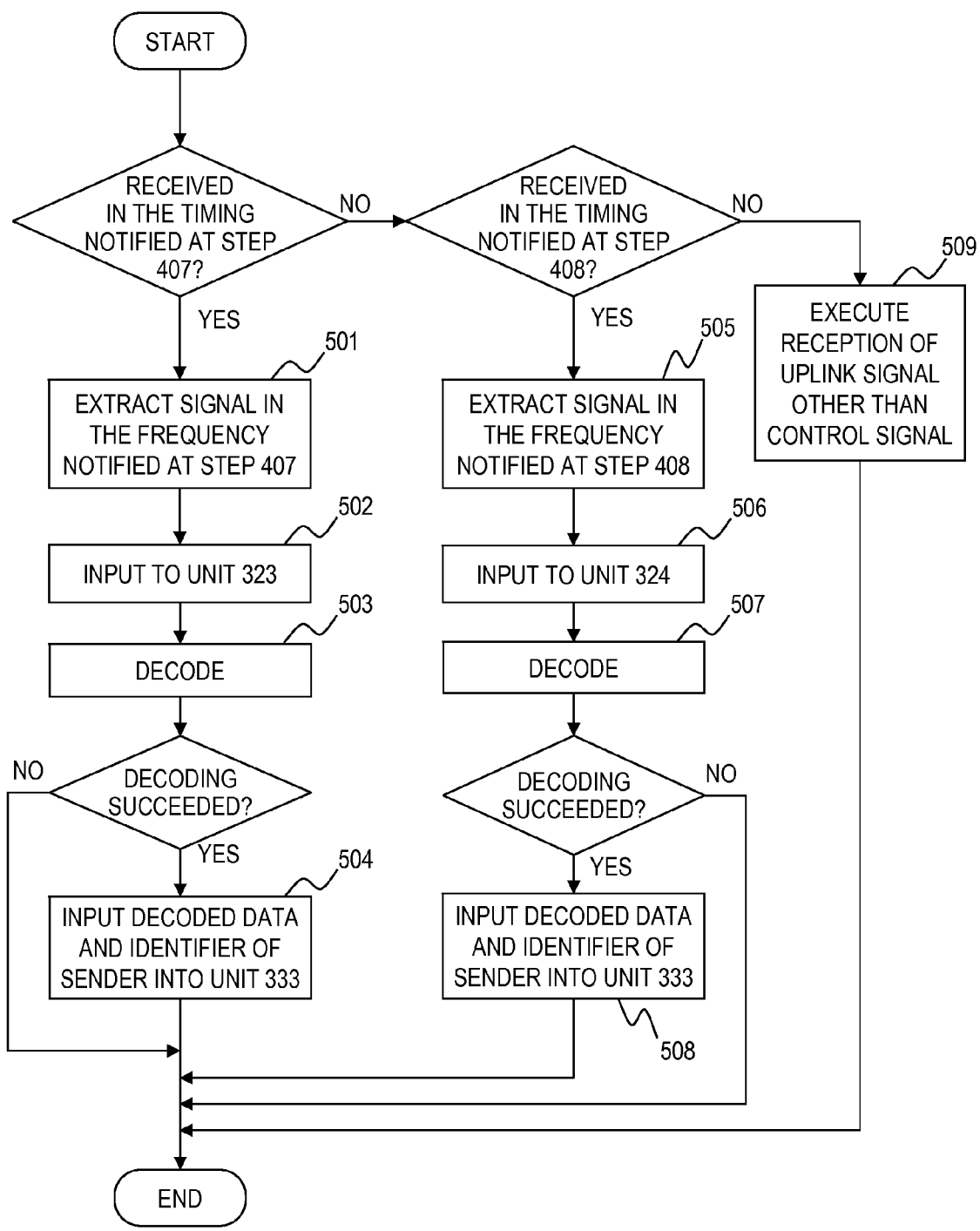
FIG. 5 is a flowchart illustrating an operation of the baseband signal decoding unit in accordance with a first embodiment of this invention.

FIG. 5 is a flowchart illustrating an operation of the baseband signal decoding unit 322.

The uplink signal received by the base station 102 is converted, by the demodulation circuit 313 of the RF processing unit 310, from a signal in a carrier band to a baseband signal, and is then input to the baseband signal decoding unit 322.

Here, depending on whether or not the input signal is received on a timing notified by the base station 102 itself, different processing is carried out. The baseband signal decoding unit 322 determines whether, by comparing the transmission timing of the uplink control signal transmitted by a mobile station to the timing of which the base station 102 has notified the mobile station in advance in the step 407, those timings coincide with each other (step 500A).

When it is determined that the transmission timings coincide with each other, the baseband signal decoding unit 322 determines that the mobile station is connected to the base station 102, extracts a signal in the frequency of which the base station 102 has notified the mobile station in advance (step 501), and inputs the extracted signal to the decoding unit for uplink control signal to this BS 323 (step 502).

The decoding unit for uplink control signal to this BS 323 uses the PilotID, the SHOGID, and the MACID stored in the reference information generating and storing unit for decoding uplink control signal to this BS 334 so as to try decoding the input signal (step 503).

When, in the step 503, the decoding is successful, the decoding unit for uplink control signal to this BS 323 inputs a result of the decoding and identification information indicating that the uplink control signal has been transmitted from the mobile station connected to the base station 102 into the uplink control information processing unit 333 (step 504).

When the decoding fails in the step 503, the baseband signal decoding unit 322 finishes the processing.

On the other hand, when the baseband signal decoding unit 322 compares the transmission timing of the uplink control signal to the timing of which the base station 102 has notified the mobile station in advance in the step 407 and determines that those timings do not coincide with each other in the step 500A, the baseband signal decoding unit 322 compares the transmission timing of the uplink control signal to the timing acquired from the neighbor base station 101 in the step 408, and determines whether those timings coincide with each other (step 500B).

When the baseband signal decoding unit 322 determines that the transmission timing of the uplink control signal and the timing acquired from the neighbor base station 101 coincide with each other, the baseband signal decoding unit 322 of the base station 102 determines that the mobile station is connected to the neighbor base station 101, extracts a signal in the frequency acquired from the base station 101 (step 505), and inputs the extracted signal into the decoding unit for uplink control signal to neighbor BS 324 (step 506).

The reference information generating and storing unit for decoding uplink control signal to neighbor BS 335 of the base station 102 stores the PilotID, the SHOGID, and the MACID notified by the base station 101 in the steps 401 and 405. The decoding unit for uplink control signal to neighbor BS 324 tries decoding the input signal based on the stored information (step 507).

When, in the step 507, the decoding is successful, the decoding unit for uplink control signal to neighbor BS 324 inputs a result of the decoding and identification information indicating that the uplink control signal has been transmitted from the mobile station connected to the neighbor base station 101 into the uplink control information processing unit 333 (step 508). When the decoding fails in the step 507, the baseband signal decoding unit 322 finishes the processing.

When the signal input into the baseband signal decoding unit 322 is not received at the timing notified by the base station 102 itself to the mobile station ("NO" in the step 500A), and is not received at the timing acquired from the neighbor base station 101 ("NO" in the step 500B), the baseband signal decoding unit 322 determines that the received signal is not an uplink control signal and carries out the reception processing for uplink signals other than the uplink control signal (step 509).

When the base station 102 processes the uplink control signal transmitted from a mobile station connected to a neighbor base station other than the base station 101, and has already acquired, from this other neighbor base station, the transmission timing and the frequency of an uplink control signal notified to the mobile station connected to this other neighbor base station, the base station 102 carries out the processing with the same steps as in the case where the base station 102 receives the uplink signal at the timing acquired from the base station 101 (steps 500B, 505, 506, 507, and 508).

A description is made of downlink transmission power control in the base station 102.

Figure 6:
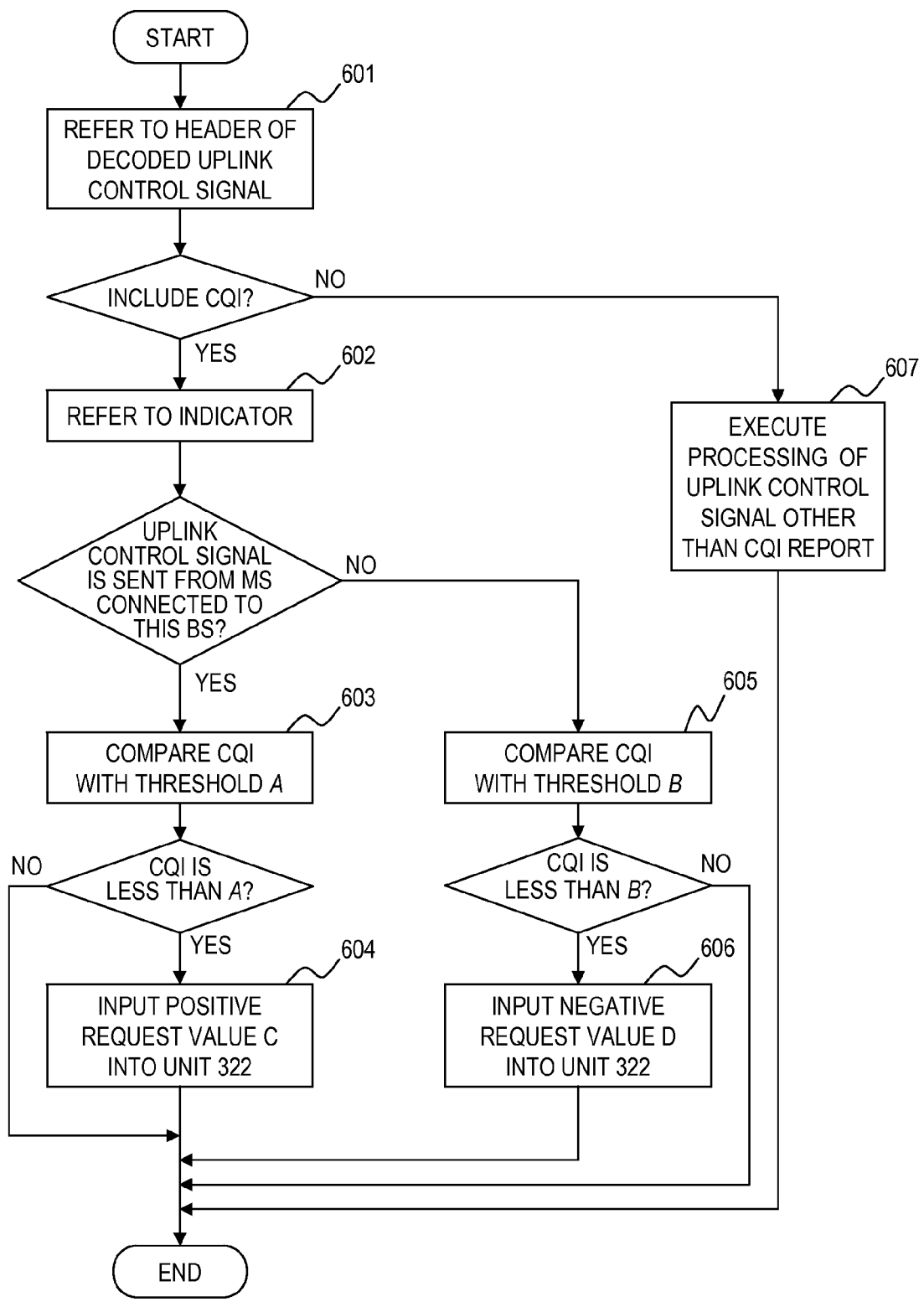
FIG. 6 is a flowchart illustrating an operation of the uplink control information processing unit in accordance with a first embodiment of this invention.

FIG. 6 is a flowchart illustrating an operation of the uplink control information processing unit 333.

The uplink control information processing unit 333 refers to a header portion of a result of the decoding of the input uplink control signal (step 601), and determines whether the CQI information is contained or not (step 601A).

In the step 601A, when the uplink control information processing unit 333 determines that the result of the decoding of the uplink control signal contains the CQI information, the uplink control information processing unit 333 refers to the identification information input along with the result of the decoding of the uplink control signal in the step 504 or 508 (step 602). When the uplink control information processing unit 333 determines that the result of the decoding of the uplink control signal does not contain the CQI information, the uplink control information processing unit 333 carries out processing relating to uplink control information other than the CQI (step 607).

Then, the uplink control information processing unit 333 refers to contents of the identification information (step 602), and determines whether the uplink control signal has been transmitted from a mobile station connected to the base station 102 (step 602A).

When the identification information indicates that the received uplink control signal has been transmitted from the mobile station connected to the base station 102, the uplink control information processing unit 333 compares the value of the CQI and a predetermined threshold A (step 603).

In the step 603, when the value of the CQI is less than the threshold A, the uplink control information processing unit 333 determines that the transmission power of the downlink signal transmitted by the base station 102 is insufficient, inputs a positive request value C requesting the transmission power calculating unit 332 to increase the transmission power (step 604), and finishes the processing. When the value of the CQI is equal to or more than the threshold A, the uplink control information processing unit 333 immediately finishes the processing.

On the other hand, when, in the step 602A, the identification information indicates that the received uplink control signal has been transmitted from a mobile station connected to the neighbor base station 101, the uplink control information processing unit 333 compares the value of the CQI and a predetermined threshold B (step 605).

In the step 605, when the value of the CQI is less than the threshold B, the uplink control information processing unit 333 determines that the downlink signal transmitted by the base station 102 is possibly interfering with the mobile station connected to the neighbor base station 101, inputs a negative request value D requesting the transmission power calculating unit 332 to decrease the transmission power (step 606), and finishes the processing. When, in the step 605, the value of the CQI is equal to or more than the threshold B, the uplink control information processing unit 333 immediately finishes the processing. Moreover, as the threshold A of the step 603 and the threshold B of the step 605, different values may be set.

Next, a description is made of processing carried out by the transmission power calculating unit 332 for determining the transmission power, based on the request value C or D input by the uplink control information processing unit 333.

The transmission power calculating unit 332 monitors the input of the request value C or D at constant intervals, and sums up the values input in the interval. When this sum is a positive value, the transmission power calculating unit 332 makes a determination to increase the downlink transmission power. On the other hand, when the sum is a negative value, the transmission power calculating unit 332 makes a determination to decrease the downlink transmission power.

Here, in the step 604, absolute values different from each other may be set to the request values C and D input to the transmission power calculating unit 332 respectively in the step 604 and the step 606.

Thus, an operator of the base station 102 can reflect a policy as to which of the request from the mobile station connected to the base station 102 and the request from the mobile station connected to the neighbor base station 101 is prioritized to what extent.

For example, when a reduction of interference is prioritized, in order to prioritize the request for decreasing the transmission power over the request for increasing the transmission power, weighting can be carried out by multiplying the request value D by a larger coefficient than a coefficient by which the request value C is multiplied.

A result of determination of the increase/decrease of the power by the transmission power calculating unit 332 is notified to the power amplifier 314. The power amplifier 314, based on the notified result of the determination, increases or decreases the transmission power presently set.

With the above-mentioned steps, the set transmission power is applied when a downlink user data traffic is transmitted. Specifically, the user data receiving unit 341 receives user data via the network 103. The received user data is input into the packet generating unit 331, and packets to be transmitted via a wireless channel are generated.

Then, the generated packets are input into the baseband signal generating unit 321, and are converted into a baseband signal of the OFDM. The baseband signal is modulated into a signal in a carrier band by the modulation circuit 312, is amplified, by the power amplifier 314, to the transmission power set with the above-mentioned steps, and is transmitted from the antenna 300.

A description is made of the processing of receiving the uplink control signal and the control for the downlink transmission power in the base station 101.

Operations of the base station 101 are the same as the operations illustrated in FIGS. 5 and 6 carried out between the base station 102 and the mobile station which is connected to the base station 102.

An uplink control signal received by the base station 101 is converted by the demodulation circuit 213 of the RF processing unit 210 from a signal in a carrier band to a baseband signal, and is then input into the baseband signal decoding unit 222. When the signal input into the baseband signal decoding unit 222 has been received at the timing notified by the base station 101 itself to the mobile station in the step 407, the baseband signal decoding unit 222 extracts a signal in the frequency notified by the base station 101 itself to the mobile station in the step 407, and inputs the extracted signal into the decoding unit for uplink control signal to this BS 223.

The decoding unit for uplink control signal to this BS 223 uses the PilotID, the SHOGID, and the MACID stored in the reference information generating and storing unit for decoding uplink control signal to this BS 234 so as to try decoding the input signal, and, when the decoding is successful, inputs a result of the decoding into the uplink control information processing unit 233.

The uplink control information processing unit 233 refers to a header portion of a result of the decoding of the input uplink control signal, and determines whether or not CQI information is contained.

When CQI information is contained in the result of the decoding of the uplink control signal, the uplink control information processing unit 233 compares the value of the CQI with a threshold set in advance, and, when the value of the CQI is less than the threshold, the uplink control information processing unit 233 determines that the transmission power of the downlink signal transmitted by the base station 101 itself is insufficient, requests the transmission power calculating unit 232 to increase the transmission power, and finishes the processing.

According to this invention, in the cellular wireless communication system, when a plurality of base stations using the same frequency are arranged while cells thereof are overlapping, a degradation of the reception quality of a downlink signal caused by interference between those base stations can be reduced.

Second Embodiment

Figure 7:
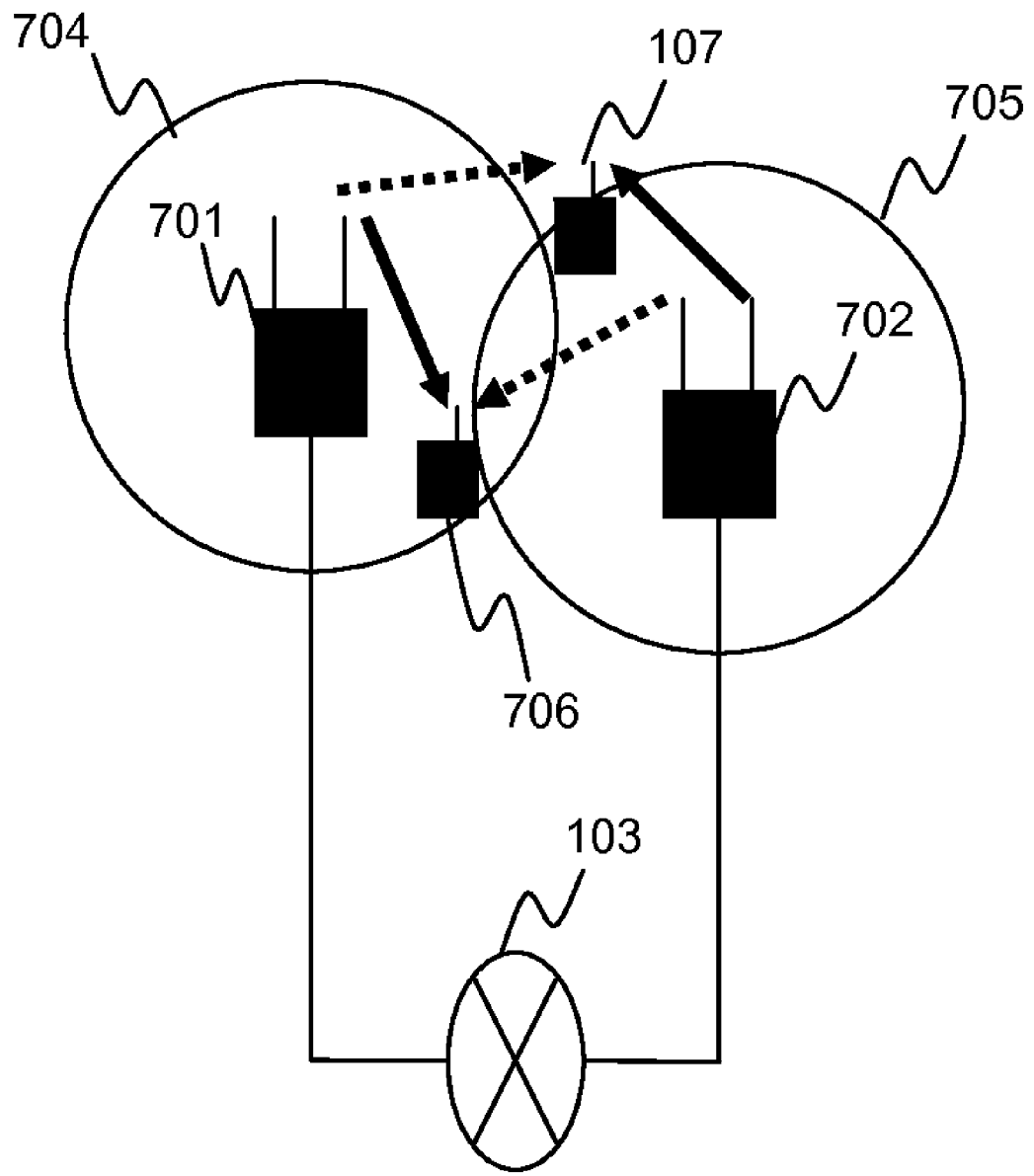
FIG. 7 is a configuration diagram of a cellular wireless communication system in accordance with a second embodiment of this invention.
Figure 8:
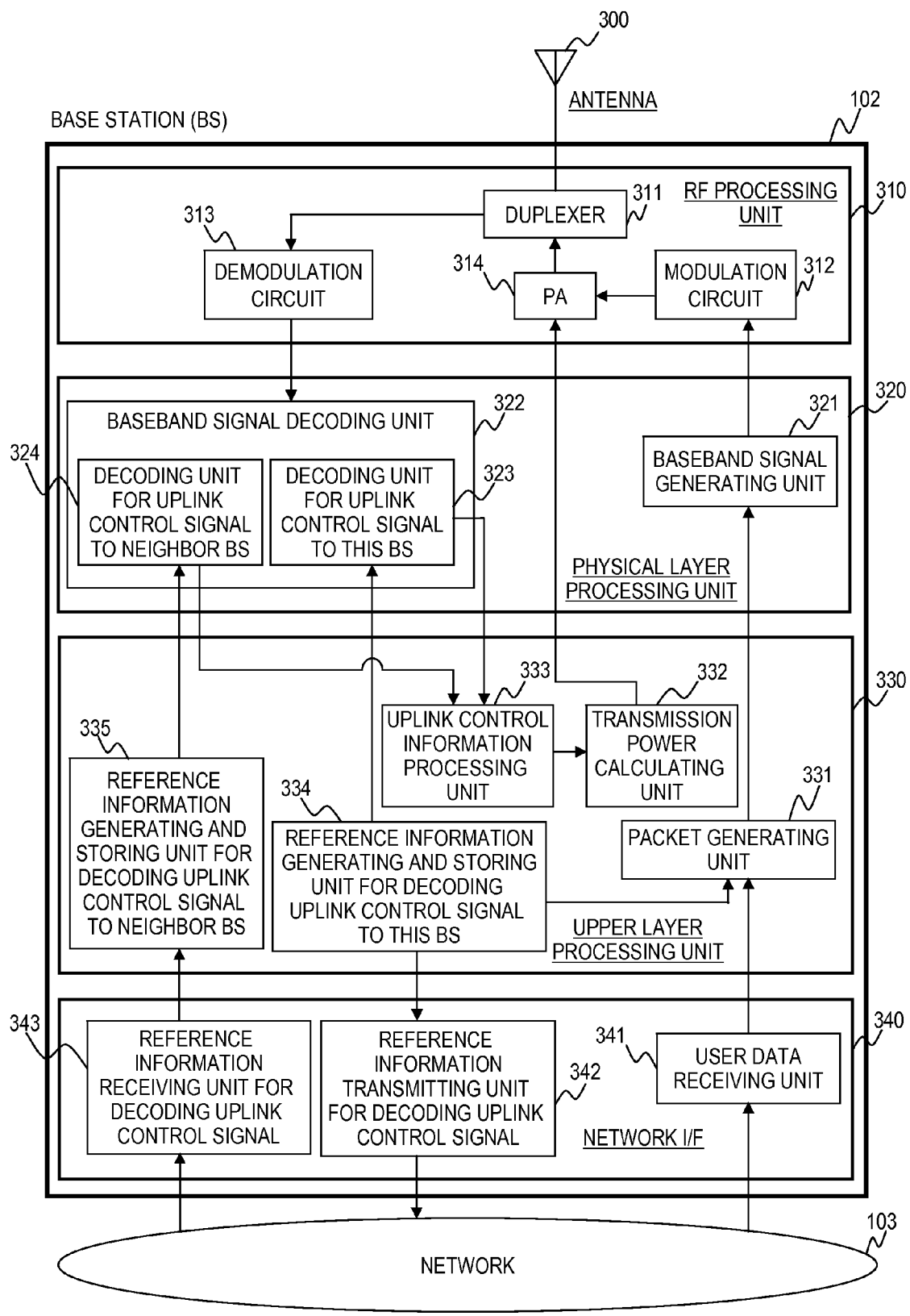
FIG. 8 is a block diagram illustrating a configuration of the base station in accordance with a first embodiment of this inventDETAILED

A description is made of a second embodiment to which this invention is applied, with reference to FIGS. 7 and 8.

FIG. 7 is a configuration diagram of a cellular wireless communication system according to the second embodiment of this invention.

The cellular wireless communication system according to the second embodiment includes a plurality of femto cell base stations, and, to each of the base stations, one or more mobile stations are connected. Base stations 701 and 702 are provided with a common wireless interface, and use the same frequency band.

It should be noted that components having the same functions as those of the components illustrated in FIG. 1 are denoted by the same numerals, and detailed description thereof is omitted.

The base stations 701 and 702 have a common wireless interface, and use the same frequency band. Moreover, the base stations 701 and 702 are connected via wired lines (or wireless links) to the network 103. The base stations 701 and 702 are femto cell base stations, and a femto cell 704 formed by the base station 701 and a femto cell 705 formed by the base station 702 are partially overlapping each other. Mobile stations 706 and 707 are connected to the base station 701 or 702 via a wireless link, thereby communicating with the network 103.

FIG. 8 is a block diagram illustrating a configuration of the base station 701 or 702.

It should be noted that components having the same functions as those of the components of the first embodiment illustrated in FIGS. 2 and 3 are denoted by the same numerals, and detailed description thereof is omitted.

FIG. 8 illustrates a configuration in which, to the configuration of the base station 102 according to the first embodiment illustrated in FIG. 3, a reference information transmitting unit for decoding uplink control signal 342 is added. The reference information transmitting unit for decoding uplink control signal 342 transmits information used for decoding the uplink control signal transmitted to the base station 102 to the network 103.

A description is made of an operation of the second embodiment. The wireless interface is compliant with the UMB specification.

While the base station 701 is operating, when the base station 702 starts and establishes a connection to the network 103, the base station 702 acquires, from the base station 701, a PilotID and a SHOGID of a cell 704 formed by the base station 701 (step 401), and stores the PilotID and the SHOGID in the reference information generating and storing unit for decoding uplink control signal to neighbor BS 335.

On the other hand, while the base station 702 is operating, when the base station 701 starts and establishes a connection to the network 103, the base station 701 acquires, from the base station 702, a PilotID and a SHOGID of a cell 705 formed by the base station 702 (step 401), and stores the PilotID and the SHOGID in the reference information generating and storing unit for decoding uplink control signal to neighbor BS 335.

When the mobile station is connected to the base station 701, the base station 701 notifies the mobile station of a MACID (steps 402, 403, and 404), then assigns a transmission timing and a frequency of an uplink control channel (steps 406 and 407), and notifies the PilotID and the SHOGID of the cell 705 (step 409).

Moreover, the base station 701 notifies the base station 702 of the MACID of the connected mobile station (step 405), and of the transmission timing and the frequency of the uplink control channel assigned to the mobile station (step 408).

On the other hand, when the mobile station is connected to the base station 702, the base station 702 notifies the mobile station of a MACID (steps 402, 403, and 404), then assigns a transmission timing and a frequency of an uplink control channel (steps 406 and 407), and notifies the PilotID and the SHOGID of the cell 705 (step 409).

Moreover, the base station 702 notifies the base station 701 of the MACID of the connected mobile station (step 405), and of the transmission timing and the frequency of the control channel assigned to the mobile station (step 408).

Further, both of the base stations 701 and 702 may receive an uplink control signal notifying the CQI transmitted from a mobile station connected to the base station to the base station, and an uplink control signal transmitted from a mobile station connected to the neighbor base station to the neighbor base station.

On this occasion, the base stations 701 and 702 carry out the same operation as the base station 102 according to the first embodiment.

The second embodiment of this invention, in addition to providing the effects of the first embodiment, is different from the first embodiment in that two base stations having cells thereof overlapping each other acquire information required for decoding an uplink control signal from the other base station, and receive both of the uplink control signals transmitted to the base stations. As a result, both of the base stations can carry out the downlink transmission power control based on the reception quality of the mobile stations connected to the base station itself and the other base station.

While the present invention has been described in detail and pictorially in the accompanying drawings, the present invention is not limited to such detail but covers various obvious modifications and equivalent arrangements, which fall within the purview of the appended claims.

What is claimed is:

1. A wireless base station comprising:
   a power control unit for controlling a transmission power of a downlink signal;
   a reference information acquisition unit for acquiring, from a neighbor base station, reference information necessary for receiving an uplink control signal transmitted from a mobile station connected to the neighbor base station; and
   a reference information storing unit for storing the reference information acquired by the reference information acquiring unit,
   wherein the wireless base station comprises:
   a first control signal receiving unit for receiving a first uplink control signal used by a mobile station connected to the wireless base station to notify the wireless base station of a reception state of the downlink signal, and for requesting the power control unit to control the transmission power based on the received first uplink control signal; and
   a second control signal receiving unit for receiving a second uplink control signal used by a mobile station connected to the neighbor base station to notify the neighbor base station of a reception state of the downlink signal by referring to the reference information stored in the reference information storing unit, and for requesting the power control unit to control the transmission power based on a content of the received second uplink control signal, and
   wherein the power control unit is configured to control the transmission power of the downlink signal based on the request to control the transmission power from the first control signal receiving unit and the request to control the transmission power from the second control signal receiving unit.

2. The wireless base station according to claim 1, wherein:
   the first control signal receiving unit requests the power control unit to increase the transmission power in a case of which the reception state notified by the first uplink control signal is worse than a first threshold; and
   the second control signal receiving unit requests the power control unit to decrease the transmission power in a case of which the reception state notified by the second uplink control signal is worse than a second threshold.

3. The wireless base station according to claim 2, wherein:
   the power control unit is configured to:
   monitor, for a predetermined period, a number of the requests to increase the transmission power from the first control signal receiving unit, and a number of the requests to decrease the transmission power from the second control signal receiving unit; and
   determine whether to increase or decrease the transmission power of the downlink signal based on the number of the requests to increase the transmission power and the number of the requests to decrease the transmission power.

4. The wireless base station according to claim 3, wherein the power control unit determines whether to increase or decrease the transmission power based on a value obtained by weighting the number of the requests received from the first control signal receiving unit and a value obtained by weighting the number of the requests received from the second control signal receiving unit.

5. A wireless communication system comprising first and second base stations for transmitting a downlink signal to a mobile station,
   wherein the second base station transmits a downlink signal at the same frequency as a frequency of the downlink signal transmitted by the first base station,
   wherein at least part of a transmission area of the downlink signal provided by the second base station overlaps a transmission area of the downlink signal provided by the first base station,
   wherein the second base station comprises:
   a control signal receiving unit for receiving a first uplink control signal used by a first mobile station connected to the first base station to notify the first base station of a reception state of the downlink signal, and a second uplink control signal used by a second mobile station connected to the second base station to notify the second base station of a reception state of the downlink signal; and
   a power control unit for determining a transmission power of the downlink signal by referring to the reception state of the downlink signal on the first mobile station notified by the first uplink control signal, and the reception state of the downlink signal on the second mobile station notified by the second uplink control signal.

6. The wireless communication system according to claim 5, wherein:
   the first base station notifies the second base station of information necessary for referring to the first uplink control signal; and
   the power control unit of the second base station uses the information acquired from the first base station so as to refer to the first uplink control signal.

7. The wireless communication system according to claim 5, wherein the control signal receiving unit of the second base station is configured to:
   request the power control unit to decrease the transmission power of the downlink signal in a case of where the reception state notified by the first uplink control signal is worse than a first threshold; and request the power control unit to increase the transmission power of the downlink signal in a case of where the reception state notified by the second uplink control signal is worse than a second threshold.

8. The wireless communication system according to claim 7, wherein the power control unit of the second base station is configured to:

monitor, for a predetermined period, a number of the requests to increase the transmission power and a number of the requests to decrease the transmission power, which have been received from the control signal receiving unit; and determine whether to increase or decrease the transmission power of the downlink signal based on the number of the requests to increase the transmission power and the number of the requests to decrease the transmission power, which have been received from the control signal receiving unit.

9. The wireless communication system according to claim 8, wherein the power control unit of the second base station determines whether to increase or decrease the transmission power based on a value obtained by weighting the number of the requests received from the control signal receiving unit.

* * * * *